United States Patent
Roberts et al.

(10) Patent No.: US 11,967,711 B2
(45) Date of Patent: Apr. 23, 2024

(54) LITHIUM, NICKEL, COBALT, MANGANESE OXIDE COMPOUND AND ELECTRODE COMPRISING THE SAME

(71) Applicant: Dyson Technology Limited, Wiltshire (GB)

(72) Inventors: Matthew Robert Roberts, Oxford (GB); Peter George Bruce, Oxford (GB); Niccolo Guerrini, Oxford (GB); Rong Hao, Shenzhen (CN); Francis Gachau Kinyanjui, Nairobi (KE)

(73) Assignee: Dyson Technology Limited, Wiltshire (GB)

( * ) Notice: Subject to any disclaimer, the term of this patent is extended or adjusted under 35 U.S.C. 154(b) by 915 days.

(21) Appl. No.: 16/955,021

(22) PCT Filed: Dec. 18, 2018

(86) PCT No.: PCT/GB2018/053655
§ 371 (c)(1),
(2) Date: Jun. 17, 2020

(87) PCT Pub. No.: WO2019/122843
PCT Pub. Date: Jun. 27, 2019

(65) Prior Publication Data
US 2020/0381724 A1 Dec. 3, 2020

(30) Foreign Application Priority Data
Dec. 18, 2017 (GB) ...................................... 1721173

(51) Int. Cl.
*H01B 1/08* (2006.01)
*C01G 51/00* (2006.01)
(Continued)

(52) U.S. Cl.
CPC ............ *H01M 4/525* (2013.01); *C01G 51/50* (2013.01); *C01G 53/50* (2013.01); *H01B 1/08* (2013.01);
(Continued)

(58) Field of Classification Search
CPC ........... H01B 1/00; H01B 1/08; H01M 4/505; H01M 4/525; C01G 51/50; C01G 53/50
See application file for complete search history.

(56) References Cited

U.S. PATENT DOCUMENTS 3,761,500 A 9/1973 Thomas
3,993,508 A 11/1976 Erlichman
(Continued)

FOREIGN PATENT DOCUMENTS

CA 2527207 A1 12/2004
CN 1404635 A 3/2003
(Continued)

OTHER PUBLICATIONS

English language machine translation of JP 2005-100947 (pub date Apr. 2005).*
(Continued)

*Primary Examiner* — Mark Kopec
(74) *Attorney, Agent, or Firm* — Tucker Ellis LLP

(57) ABSTRACT

A compound of the general formula: wherein x is equal to or greater than 0.175 and equal to or less than 0.325 and y is equal to or greater than 0.05 and equal to or less than 0.35. In another embodiment, x is equal to zero and y is greater than 0.12 and equal to or less than 0.4. The compound is also formulated into a positive electrode for use in an electrochemical cell.

14 Claims, 8 Drawing Sheets

(51) Int. Cl.
*C01G 53/00* (2006.01)
*H01M 4/505* (2010.01)
*H01M 4/525* (2010.01)
*H01M 4/62* (2006.01)
*H01M 10/0525* (2010.01)
*H01M 4/02* (2006.01)

(52) U.S. Cl.
CPC .......... *H01M 4/505* (2013.01); *H01M 4/622* (2013.01); *H01M 4/623* (2013.01); *H01M 4/625* (2013.01); *H01M 10/0525* (2013.01); *C01P 2002/20* (2013.01); *C01P 2002/50* (2013.01); *C01P 2002/72* (2013.01); *C01P 2006/40* (2013.01); *H01M 2004/028* (2013.01)

(56) References Cited

U.S. PATENT DOCUMENTS

| | | | |
|---|---|---|---|
| 4,047,289 A | 9/1977 | Wolff | |
| 4,288,381 A | 9/1981 | Dozzi et al. | |
| 4,299,986 A | 11/1981 | Cucinella | |
| 5,136,046 A | 8/1992 | Park et al. | |
| 5,250,784 A | 10/1993 | Muller et al. | |
| 5,411,592 A | 5/1995 | Ovshinsky et al. | |
| 5,670,652 A | 9/1997 | Drauz et al. | |
| 5,718,989 A | 2/1998 | Aoki et al. | |
| 6,616,714 B1 | 9/2003 | Gauthier et al. | |
| 7,754,384 B2 | 7/2010 | Patoux et al. | |
| 8,153,301 B2 | 4/2012 | Jiang | |
| 8,546,018 B2 | 10/2013 | Kajiyama | |
| 8,722,250 B2 | 5/2014 | Park | |
| 9,293,766 B2 | 3/2016 | Liu et al. | |
| 9,325,030 B2 | 4/2016 | Zidan | |
| 9,525,173 B2 | 12/2016 | Kagei et al. | |
| 9,575,025 B2 | 2/2017 | Nakayama et al. | |
| 9,593,024 B2 | 3/2017 | Thackeray et al. | |
| 9,692,084 B2 | 6/2017 | Yang et al. | |
| 9,755,272 B2 | 9/2017 | Gaben | |
| 9,768,450 B2 | 9/2017 | Song et al. | |
| 9,843,041 B2 | 12/2017 | Lopez | |
| 9,887,430 B2 * | 2/2018 | Terashima ............. | C01G 53/44 |
| 9,893,376 B2 | 2/2018 | Yang et al. | |
| 9,947,916 B2 | 4/2018 | Oda | |
| 9,960,458 B2 | 5/2018 | Weicker et al. | |
| 9,997,774 B2 | 6/2018 | Hiratsuka | |
| 10,199,649 B2 | 2/2019 | Beck et al. | |
| 10,290,869 B2 | 5/2019 | Axelbaum | |
| 10,629,902 B2 | 4/2020 | Yu | |
| 2002/0110733 A1 | 8/2002 | Johnson | |
| 2003/0022063 A1 | 1/2003 | Paulsen et al. | |
| 2003/0129495 A1 | 7/2003 | Yamato et al. | |
| 2003/0162086 A1 | 8/2003 | Longhi, Jr. et al. | |
| 2004/0091779 A1 | 5/2004 | Kang et al. | |
| 2005/0014065 A1 | 1/2005 | Jung et al. | |
| 2005/0112466 A1 | 5/2005 | Jordy et al. | |
| 2006/0160261 A1 | 7/2006 | Sheats | |
| 2007/0238019 A1 | 10/2007 | Laurent et al. | |
| 2008/0263855 A1 | 10/2008 | Li et al. | |
| 2008/0264478 A1 | 10/2008 | Ahn et al. | |
| 2009/0148764 A1 | 6/2009 | Kwak et al. | |
| 2010/0108939 A1 | 5/2010 | Breger et al. | |
| 2010/0233542 A1 | 9/2010 | Endo et al. | |
| 2010/0248033 A1 | 9/2010 | Kumar et al. | |
| 2011/0126402 A1 | 6/2011 | Kwak et al. | |
| 2011/0129594 A1 | 6/2011 | Kwak et al. | |
| 2011/0168944 A1 | 7/2011 | Chang et al. | |
| 2011/0291043 A1 | 12/2011 | Wilcox et al. | |
| 2011/0294015 A1 | 12/2011 | Pirk et al. | |
| 2011/0311883 A1 | 12/2011 | Oukassi et al. | |
| 2012/0183855 A1 | 7/2012 | Wohlfahrt-Mehrens et al. | |
| 2012/0225199 A1 | 9/2012 | Muthu et al. | |
| 2012/0270114 A1 | 10/2012 | Reynolds et al. | |
| 2012/0312474 A1 | 12/2012 | Kwak et al. | |
| 2012/0321815 A1 | 12/2012 | Song et al. | |
| 2013/0040201 A1 | 2/2013 | Manthiram | |
| 2013/0160283 A1 | 6/2013 | Wu | |
| 2013/0260248 A1 | 10/2013 | Seki et al. | |
| 2013/0298387 A1 | 11/2013 | Kobier et al. | |
| 2014/0000100 A1 | 1/2014 | Oh et al. | |
| 2014/0007418 A1 | 1/2014 | Song et al. | |
| 2014/0120397 A1 | 5/2014 | Kim et al. | |
| 2014/0154555 A1 | 6/2014 | Endoh et al. | |
| 2014/0154581 A1 | 6/2014 | Kawasato et al. | |
| 2014/0178748 A1 | 6/2014 | Chernyshov et al. | |
| 2014/0227594 A1 | 8/2014 | Song et al. | |
| 2014/0227609 A1 | 8/2014 | Frey et al. | |
| 2014/0242463 A1 | 8/2014 | Song | |
| 2014/0255603 A1 | 9/2014 | Xiao et al. | |
| 2015/0010822 A1 | 1/2015 | Nakahara et al. | |
| 2015/0010872 A1 | 1/2015 | Schindler et al. | |
| 2015/0050522 A1 | 2/2015 | Manthiram et al. | |
| 2015/0064558 A1 | 3/2015 | Seki et al. | |
| 2015/0102530 A1 | 4/2015 | Wallace et al. | |
| 2015/0180031 A1 | 6/2015 | Thackeray et al. | |
| 2015/0188186 A1 | 7/2015 | Bedjaoui et al. | |
| 2015/0280201 A1 | 10/2015 | Bhardwaj | |
| 2016/0164088 A1 | 6/2016 | Peralta et al. | |
| 2016/0164092 A1 | 6/2016 | Stottlemyer | |
| 2016/0190551 A1 * | 6/2016 | Endo .................... | H01M 4/364 252/182.1 |
| 2016/0218362 A1 | 7/2016 | Kagei et al. | |
| 2016/0218364 A1 | 7/2016 | Sakai et al. | |
| 2016/0254539 A1 | 9/2016 | Kagei et al. | |
| 2016/0294010 A1 | 10/2016 | Herb et al. | |
| 2016/0372783 A1 | 12/2016 | Min et al. | |
| 2017/0133678 A1 | 5/2017 | Ozoemena et al. | |
| 2019/0044182 A1 | 2/2019 | Maeda et al. | |
| 2019/0115595 A1 | 4/2019 | Dong et al. | |
| 2019/0115627 A1 | 4/2019 | Rendall | |
| 2019/0334171 A1 | 10/2019 | Ozoemena | |
| 2020/0220221 A1 | 7/2020 | Keyzer et al. | |
| 2020/0280099 A1 | 9/2020 | Keyzer et al. | |
| 2020/0335786 A1 | 10/2020 | Roberts et al. | |
| 2020/0377376 A1 | 12/2020 | Roberts et al. | |
| 2020/0381718 A1 | 12/2020 | Roberts et al. | |
| 2020/0381725 A1 | 12/2020 | Roberts et al. | |
| 2020/0381726 A1 | 12/2020 | Roberts et al. | |
| 2023/0365428 A1 | 11/2023 | Roberts et al. | |
| 2023/0395861 A1 | 12/2023 | Keyzer et al. | |

FOREIGN PATENT DOCUMENTS

| | | | |
|---|---|---|---|
| CN | 1458706 | A | 11/2003 |
| CN | 1464573 | A | 12/2003 |
| CN | 1610154 | A | 4/2005 |
| CN | 101128941 | A | 2/2008 |
| CN | 101562245 | A | 10/2009 |
| CN | 101694876 | A | 4/2010 |
| CN | 101855770 | A | 10/2010 |
| CN | 102054986 | A | 5/2011 |
| CN | 102074700 | A | 5/2011 |
| CN | 102881873 | A | 1/2013 |
| CN | 103035900 | A | 4/2013 |
| CN | 103066274 | A | 4/2013 |
| CN | 103311513 | A | 9/2013 |
| CN | 103545519 | A | 1/2014 |
| CN | 103887562 | A | 6/2014 |
| CN | 105047898 | A | 11/2015 |
| CN | 105742607 | A | 7/2016 |
| CN | 105810934 | A | 7/2016 |
| CN | 103943844 | B | 8/2016 |
| CN | 106410186 | A | 2/2017 |
| CN | 106573795 | A | 4/2017 |
| CN | 106910887 | A | 6/2017 |
| CN | 104241633 | B | 9/2017 |
| DE | 4227720 | A1 | 4/1993 |
| EP | 1189296 | A2 | 3/2002 |
| EP | 2746288 | A1 | 6/2014 |
| EP | 2763219 | A2 | 8/2014 |
| EP | 2827430 | A1 | 1/2015 |
| EP | 3093272 | A1 | 11/2016 |
| GB | 1402544 | A | 8/1975 |
| GB | 2128604 | A | 5/1984 |
| JP | 45-035555 | | 11/1970 |

(56) References Cited

FOREIGN PATENT DOCUMENTS

| | | | |
|---|---|---|---|
| JP | 57-96472 A | 6/1982 |
| JP | S64-21870 A | 1/1989 |
| JP | H4-269721 A | 9/1992 |
| JP | 09-237631 A | 9/1997 |
| JP | 2000-149911 A | 5/2000 |
| JP | 2002-343342 A | 11/2002 |
| JP | 2003-226955 A | 8/2003 |
| JP | 2005-044801 A | 2/2005 |
| JP | 2005-100947 A | 4/2005 |
| JP | 2005-150093 A | 6/2005 |
| JP | 2005-150102 A | 6/2005 |
| JP | 2006-294597 A | 10/2006 |
| JP | 2007-503102 A | 2/2007 |
| JP | 2009-182273 A | 8/2009 |
| JP | 2009-246236 A | 10/2009 |
| JP | 2009-544141 A | 12/2009 |
| JP | 2010-251075 A | 11/2010 |
| JP | 2011-108603 A | 6/2011 |
| JP | 2012-129166 A | 7/2012 |
| JP | 2013-506945 A | 2/2013 |
| JP | 2014-510372 A | 4/2014 |
| JP | 2014-112476 A | 6/2014 |
| JP | 2014-146458 A | 8/2014 |
| JP | 2014-529176 A | 10/2014 |
| JP | 2014-531718 A | 11/2014 |
| JP | 2014-531719 A | 11/2014 |
| JP | 2017-521848 A | 8/2017 |
| KR | 10-2004-0096063 A | 11/2004 |
| KR | 10-2014-0081468 A | 7/2014 |
| KR | 10-2016-0091172 A | 8/2016 |
| KR | 10-2017-0008540 A | 1/2017 |
| KR | 10-2017-0025874 A | 3/2017 |
| TW | 201145648 A | 12/2011 |
| WO | 2006/027925 A2 | 3/2006 |
| WO | 2006/071972 A2 | 7/2006 |
| WO | 2009/055529 A1 | 4/2009 |
| WO | 2010/036723 A1 | 4/2010 |
| WO | 2011/039132 A1 | 4/2011 |
| WO | 2011/052607 A1 | 5/2011 |
| WO | 2012/065767 A1 | 5/2012 |
| WO | 2013/021955 A1 | 2/2013 |
| WO | 2013/035519 A1 | 3/2013 |
| WO | 2013/118659 A1 | 8/2013 |
| WO | 2013/146723 A1 | 10/2013 |
| WO | 2015/007586 A1 | 1/2015 |
| WO | 2015/053357 A1 | 4/2015 |
| WO | 2015/107194 A1 | 7/2015 |
| WO | 2016/001884 A1 | 1/2016 |
| WO | 2016/210419 A1 | 12/2016 |
| WO | 2017/047280 A1 | 3/2017 |
| WO | 2017/087403 A1 | 5/2017 |

OTHER PUBLICATIONS

Pham et al "Understanding the interfacial phenomena of a 4.7 V and 55 C Li-ion battery with Li-rich layered oxide cathode and graphite anode and its correlation to high-energy cycling performance", Journal of Power Sources 323 (2016) 220e230.*

Office Action received for Japanese Patent Application No. 2020-552158, dated Aug. 10, 2022, 8 pages (3 pages of English Translation and 5 pages of Original Document).

Office Action received for Korean Patent Application No. 10-2020-7018911, dated Feb. 14, 2022, 16 pages (8 pages of English Translation and 8 pages of Original Document).

Office Action received for Korean Patent Application No. 10-2020-7018912, dated Aug. 17, 2022, 10 pages (5 pages of English Translation and 5 pages of Original Document).

Office Action received for Korean Patent Application No. 10-2020-7018912, dated Feb. 14, 2022, 16 pages (8 pages of English Translation and 8 pages of Original Document).

Jang et al., Electrochemical and Solid-State Letters, 1 (1) 13-16 (1998) (Year: 1998).

Xu et al. English machine translation of CN103066274A. (Year: 2013).

Zhang et al. English machine translation of CN105047898A. (Year: 2015).

Meese-Marktscheffel et al., "Magnesium-aluminum alkoxides: the synthesis of Mg[Al(OR)4]2 (R=Busec and Ph), structure of (thf)2Mg[(μ-OPh)2Al (OPh))2]2, and dynamic NMR of Mg[Al(OBusec)4]2", Polyhedron, 1994, vol. 13, No. 6-7, pp. 1045-1050.

Office Action received for Japanese Application No. 2020-515116, dated Oct. 12, 2021, 4 pages (2 pages of English Translation and 2 pages of Original Document).

Govil et al., "Some Double Ethoxides of Alkaline Earth Metals with Aluminium", Synthesis and Reactivity in Inorganic and Metal-Organic Chemistry, vol. 5, No. 4, 1975, pp. 267-277.

International Search Report and Written Opinion received for PCT Patent Application No. PCT/GB2018/052537, dated Dec. 19, 2018, 17 pages.

International Search Report and Written Opinion received for PCT Patent Application No. PCT/GB2018/052538, dated Oct. 29, 2018, 11 pages.

International Search Report and Written Opinion received for PCT Patent Application No. PCT/GB2018/053656, dated Feb. 15, 2019, 11 pages.

International Search Report and Written Opinion received for PCT Patent Application No. PCT/GB2018/053657, dated Apr. 15, 2019, 14 pages.

International Search Report and Written Opinion received for PCT Patent Application No. PCT/GB2018/053659, dated Apr. 8, 2019, 16 pages.

International Search Report and Written Opinion received for PCT Patent Application No. PCT/GB2018/053660, dated Feb. 14, 2019, 9 pages.

International Search Report and Written Opinion received for PCT Patent Application No. PCT/GB2018/053663, dated Sep. 15, 2019, 10 pages.

Office Action received for Japanese Patent Application No. 2020-552157, dated Jun. 21, 2021, 10 pages (5 pages of English Translation and 5 pages of Original Document).

Office Action received for Japanese Patent Application No. 2020-552160, dated Jul. 5, 2021, 5 pages (2 pages of English Translation and 3 pages of Original Document).

Office Action received for Korean Patent Application No. 10-2020-7010108, dated Jul. 28, 2021, 10 pages (5 pages of English Translation and 5 pages of Original Document).

Office Action received for Korean Patent Application No. 10-2020-7010109, dated Jul. 28, 2021, 10 pages (5 pages of English Translation and 5 pages of Original Document).

Search Report dated Jun. 28, 2018, directed to GB Application 1721179.8; 2 pages.

Search Report dated Jun. 28, 2018, directed to GB Application No. 1721177.2; 2 pages.

Search Report dated Jun. 28, 2018, directed to GB Application No. 1721178.0; 2 pages.

Search Report dated Jun. 28, 2018, directed to GB Application No. 1721180.6; 2 pages.

Search Report dated May 30, 2018, directed to GB Application No. 1714770.3, 2 pages.

Feng-min et al., "Recent Developments on Li-ion Batteries positive materials," Battery Bimonthly, vol. 33, No. 6, Dec. 30, 2003, 3 pages.

Hu et al., "Electric Vehicles 3rd Edition" Section 2 Power Battery, vol. 3, Jan. 31, 2003, 12 pages.

Office Action received for Chinese Patent Application No. 201880081278.2, dated Jan. 26, 2022, 18 pages (10 pages of English Translation and 8 pages of Original Document).

Second Office Action received for Chinese Patent Application No. 201880081278.2, dated Jun. 29, 2022, 20 pages (13 pages of English Translation and 7 pages of Original Document).

Third Office Action received for Chinese Patent Application No. 201880081278.2, dated Oct. 19, 2022, 14 pages (9 pages of English Translation and 5 pages of Original Document).

(56) References Cited

OTHER PUBLICATIONS

Office Action received for Japanese Patent Application No. 2020552156 dated Sep. 7, 2021, 12 pages (6 pages of English Translation and 6 pages of Original Document).
Breger et al "High-resolution X-ray diffraction, DIFFaX, NMR and first principles study of disorder in the Li2MnO3—Li[Ni1/2Mn1/2]O2 solid solution", Journal of Solid State Chemistry 178 (2005) 2575-2585.
Jiang et al "Electrochemical and structural study of the layered, "Li-excess" lithium-ion battery electrode material Li[Li1/9Ni1/3Mn5/9]O2", Chem. Mater. 2009, 21, 2733-2745.
Office Action received for Chinese Patent Application No. 201880081413.3, dated Mar. 15, 2022, 17 pages (10 pages of English Translation and 7 pages of Original Document).
Office Action received for Japanese Patent Application No. 2020-552157, dated Jan. 25, 2022, 5 pages (2 pages of English Translation and 3 pages of Original Document).
Park et al., "The Effects of Ni Doping on the Performance of O3-Lithium Manganese Oxide Material", Korean J. Chem. Eng., vol. 21, No. 5, 2004, pp. 983-988.
Kim et al.; "Synthesis and electrochemical behavior of Li[Li0.1Ni0.35-x/2CoxMn0.55-x/2]O2 cathode materials"; Solid State Ionics 164, pp. 43-49. (Year: 2003).
Kim et al.; ("Electrochemical properties of Li[Li(1-x)/3CoxMn(2-2x)/3]O2 (0<x<1) solid solutions prepared by poly-vinyl alcohol method"; Electrochemistry Communications 9, pp. 103-108. (Year: 2007).
Sun et al.; "The preparation and electrochemical performance of solid solutions LiCoO2—Li2MnO3 as cathode materials for lithium ion batteries"; Electrochimica Acta 51, pp. 5581-5586. (Year: 2006).
Thackeray et al. "Li2MnO3-stabilized LiMO2 (M=Mn, Ni, Co) electrodes for lithium-ion batteries"; J. of Materials Chemistry, vol. 17, No. 30, pp. 3053-3272. (Year: 2007).
Xiang et al.; "Understanding the Influence of Composition and Synthesis Temperature on Oxygen Loss, Reversible Capacity, and Electrochemical Behavior of xLi2MnO3 (1-x)LiCoO2 Cathodes in the First Cycle"; J. Phys. Chem. 118, pp. 23553-23558. (Year: 2014).
Birrozzi et al. (2016). "Beneficial effect of propane sultone and tris(trimethylsilyl) borate as electrolyte additives on the cycling stability of the lithium rich nickel manganese cobalt (NMC) oxide," Journal of Power Sources 325:525-533.
Cucinella et al. (1982). "Calcium Alkoxyalanates I. Synthesis and Physicochemical Characterization," Journal of Organometallic Chemistry 224(1): 1-12.
Hudson et al. (2007). "Studies on Synthesis and Dehydrogenation Behavior of Magnesium Alanate and Magnesium-Sodium Alanate Mixture," International Journal of Hydrogen Energy 32(18): 4933-4938.
International Search Report and Written Opinion dated Apr. 8, 2019, directed to International Application No. PCT/GB2018/053655; 18 pages.
Lu et al. (Apr. 2002). "Synthesis, Structure, and Electrochemical Behavior of Li[NixLi(1/3-2x/3)Mn(2/3-x/3)]O2," Journal of the Electrochemical Society, 149(6): A778-A791.
Mehrotra et al. (Jan. 1978). "Preparation and Characterization of Some Volatile Double Isopropoxides of Aluminium with Alkaline Earth Metals," Inorganica Chimica Acta 29:131-136.
Metz et al. (2002). "Weakly Coordinating Al-, Nb-, Ta-, Y-, and La-Based Perfluoroaryloxymetalate Anions as Cocatalyst Components for Single-Site Olefin Polymerization," Organometallics 21(18): 3691-3702.
Park et al. (Apr. 2004). "Structural investigation and electrochemical behaviour of Li[NixLi(1/3-2x/3)Mn(2/3-x/3)]O2 compounds by a simple combustion method," Journal of Power Sources 129: 288-295.
Park et al. (May 2010). "Suppression of O2 evolution from oxide cathode for lithium-ion batteries: VOx-impregnated 0.5Li2MnO3-0.5LiNi0.4Co0.2Mn0.4O2 cathode," Chemical Communications, 46(23): 4190-4192.

Search Report dated Jun. 28, 2018, directed to GB Application No. 1721173.1; 2 pages.
Thackeray et al. (Aug. 2006). "Comments on the structural complexity of lithium-rich Li1+xM1-xO2 electrodes (M+Mn, Ni, Co) for lithium batteries," Electrochemistry Communications 8(9):1531-1538.
Turova et al. (1977). "Hydrolysis and Alcoholysis of Alkali Metal Aluminium Hydrides," Inorganica Chimica Acta, 21:157-161.
Wu et al. (Mar. 2006). "High Capacity, Surface-Modified Layered Li[Li(1-x)/3Mn(2-x)/3Nix/3Cox/3]O2 Cathodes with Low Irreversible Capacity Loss," Electrochemical and Solid-State Letters 9(5): A221-A224.
Yasushi et al. (Nov. 16, 1984) "CAS No. [32843-22-4] Aluminate(1-), tetrakis(diphenylaminato)-, magnesium," (2 pages).
Notification of Reason(S) for Refusal received for Korean Application No. 10-2020-7018773, dated Sep. 23, 2021, 12 pages (6 pages of English Translation and 6 pages of Original Document).
Office Action received for Japanese Patent Application No. 2020-552161, dated Sep. 7, 2021, 4 pages (2 pages of English Translation and 2 pages of Original Document).
Office Action received for Japanese Patent Application No. 2020-552159, dated Sep. 7, 2021, 4 pages (2 pages of English Translation and 2 pages of Original Document).
Office Action received for Korean Patent Application No. 10-2020-7018774, dated Sep. 23, 2021, 10 pages (5 pages of English Translation and 5 pages of Original Document).
Peretich, A.L., Amenta, D.S., Gilje, J.W. et al. "Crystal Structure of [Me2NCH(O)]2Mg[{lj-OPri)2Al(OPri)2]2". J Chem Crystallogr 40, 716-719 (2010). https://doi.org/10.1007/s10870-010-9783-x.
Lee et al., "High capacity Li[Li0.2Ni0.2Mn0.6]P2 cathode materials via a carbonate co-precipitation method," Journal of Power Sources, vol. 162, No. 2, Sep. 12, 2006, pp. 1346-1350.
Office Action received for Chinese Patent Application No. 201880081264.0, dated Feb. 7, 2022, 19 pages (11 pages of English Translation and 8 pages of Original Document).
Office Action received for Chinese Patent Application No. 201880081346.5, dated Mar. 21, 2023, 12 pages (4 pages of English Translation and 8 pages of Original Document).
Xingyong, S., "Electrochemical Properties and Structural Analysis of Li[NixLi(1/3-2x/3)Mn(2/3-x/3)]O2 (x=0.2, 0.3, 0.4) Materials," China Master's Thesis Full-Text Database Electronic Journal, No. 5, May 15, 2017, pp. 12-23.
Jiang et al., "Electrochemical and thermal studies of Li[NixLi(1/3-2x/3)Mn(2/3-x/3)]O2 (x=1/12, 1/4, 5/12, and 1/2)", Electrochemica Acta, vol. 50, 2005, pp. 4778-4783.
Office Action received for Chinese Patent Application No. 201880081346.5, dated Jan. 27, 2022, 19 pages (11 pages of English Translation and 8 pages of Original Document).
Office Action received for Korean Patent Application No. 10-2020-7018752, dated Nov. 16, 2021, 10 pages (5 pages of English Translation and 5 pages of Original Document).
Synthesis and performance studies of lithium-rich cathode materials Li[Li(1-x)/3Ni2x/3Mn(2-x)/3]O2 and Li[Li( 1-x)/3NixMn(2-2x)/3]O2, Tiantian WU, China Master's Theses Full-text Database: Engineering Technology vol. II, No. 7.
Yang et al., "Porous 0.2Li2MnO3•0.8LiNi0.5Mn0.5O2 nanorods as cathode materials for lithium-ion batteries", ESI for J. Mater. Chem. A, vol. 2, 2013, pp. 5.
Zhang et al., "Synthesis and electrochemistry of layered 0.6LiNi0.5Mn0.5O2•xLi2MnO3•yLiCoO2 (x+y=0.4) cathode materials", Materials Letters, vol. 58, 2004, pp. 3197-3200.
Gao Min et al., CN-106910887 Machine Translation (Year: 2017).
Nayak et al., Al Doping for Mitigating the Capacity Fading and Voltage Decay of Layered Li and Mn-Rich Cathodes for Li-Ion Batteries, Adv. Energy Mater. 2016, 6, 1502398 (13 pages), DOI: 10.1002/aenm.201502398 (Year: 2016).
Zheng et al., Stability and Rate Capability of Al Substituted Lithium-Rich High-Manganese Content Oxide Materials for Li-Ion Batteries, Journal of The Electrochemical Society, 159 (2) A116-A120, 2011 (Year: 2011).

* cited by examiner

1st Cycle Discharge

5th Cycle Discharge

1st Cycle Discharge

LITHIUM, NICKEL, COBALT, MANGANESE OXIDE COMPOUND AND ELECTRODE COMPRISING THE SAME

REFERENCE TO RELATED APPLICATIONS

This application is a national stage application under 35 U.S.C. 371 of International Application No. PCT/GB2018/053655, filed Dec. 18, 2018, which claims the priority of United Kingdom Application No. 1721173.1, filed Dec. 18, 2017, the entire contents of each of which are incorporated herein by reference.

FIELD OF THE DISCLOSURE

The present invention relates to a set of electroactive cathode compounds. More specifically the present invention relates to a set of high capacity lithium rich MC compounds.

BACKGROUND OF THE DISCLOSURE

Conventional lithium ion batteries are limited in performance by the capacity of the material used to make the positive electrode (cathode). Lithium rich blends of cathode materials containing blends of nickel manganese cobalt oxide offer a trade-off between safety and energy density. It is understood that charge is stored in the transition metal cations within such cathode materials. It has been suggested that the capacity, and therefore energy density, of cathode materials could be significantly increased if charge could be stored on anions (for example oxygen) reducing the need for such high amounts of heavy transition metal ions. However, a challenge remains to provide a material that can rely on the redox chemistries of both the anions and cations to store charge, and withstand charge/discharge cycles without compromising the safety of the material, or causing undesired redox reactions which would break down the material.

SUMMARY OF THE DISCLOSURE

In a first aspect, the present invention provides a compound of the general formula:

$$Li_{\left(\frac{4}{3}-\frac{2x}{3}-\frac{y}{3}\right)}Ni_xCo_yMn_{\left(\frac{2}{3}-\frac{x}{3}-\frac{2y}{3}\right)}O_2$$

wherein x has a value equal to or greater than 0.175 and equal to or less than 0.325; and y has a value equal to or greater than 0.05 and equal to or less than 0.35.

In a second aspect the present invention provides a compound of the general formula:

$$Li_{\left(\frac{4}{3}-\frac{y}{3}\right)}Co_yMn_{\left(\frac{2}{3}-\frac{2y}{3}\right)}O_2$$

wherein y has a value greater than 0.12 and equal to or less than 0.4.

It has been found that a compound with an improved capacity can be achieved by reducing the amount of excess lithium and increasing the amount of cobalt and/or nickel. The particular compound as defined above exhibits a significantly large increase in capacity due to the degree of oxidation of cobalt and/or nickel and also the oxidation of the oxide ions within the lattice. Without wishing to be bound by theory, it is understood that the presence of a particular amount of cobalt and/or nickel substitution enables oxygen redox activity and thereby improves the electrochemical capacity of the material.

In addition, the compounds of the present invention exhibit improved stability during electrochemical cycling when compared to the transition metal substituted NMC lithium rich materials of the prior art. The evolution of molecular oxygen is ubiquitous with third row lithium-rich materials transition metal oxides where lithium has been exchanged for some of the transition metal ions ($Li_{1+x1}M_{1-x}O_2$, where M is Ti, V, Cr, Mn, Fe, Co, Ni, Cu or Zn). These materials generally rely on oxygen redox to improve their charge capacity properties. Homogenous materials can suffer from molecular oxygen escaping from the crystal structure during cycling due to redox of the oxide anion. In turn, this reduces the capacity and useful lifetime of the material.

It is understood that when the charge imbalance caused by the removal of a lithium ion is balanced by the removal of an electron from the oxygen anion the resulting oxygen anion is unstable which results in undesired redox reactions and the evolution of molecular oxygen gas during charge cycling. Without wishing to be bound by theory, it is understood that the specific cobalt and/or nickel content in the material relative to the lithium content avoids under-bonding within the lattice such that each oxygen anion is still bonded to ~3 cations. The chemical approach of the present invention tunes the structure of the lattice using specific amounts of transition metals which improves capacity of the material and the increases the stability of the material over a number of charge/discharge cycles.

In examples x is 0. In other words, the nickel content of the compound is effectively zero. y (i.e. the cobalt content) is greater than 0.12. In an even more particular example y may be equal to or greater than 0.2. It has been demonstrated that capacity of the material is significantly improved when y is equal to or is greater than 0.2. In addition y may be equal to or less than 0.4. It is understood that the capacity of the material declines to expected levels above this threshold. It has been demonstrated that improved capacity is achieved when y is 0.3. More specifically, the value of y could be said to be greater than 0.2 and equal to or less than 0.4. More specifically, the value of y could be said to be greater than 0.2 and equal to or less than 0.3. In two particular examples, y may equal either 0.2 or 0.3. When x is zero, the values of x+y (i.e. the value of y) can be said to be 0.2 or 0.3.

In alternative examples x has a value greater than 0. That is to say that the compound contains a fraction of nickel. The addition of nickel has been shown to reduce the amount of molecular oxygen that escapes that material during a charge and discharge cycle. The values of nickel and cobalt doing into the lithium-rich material can be said to be related to an overall amount. This means that the overall amount of nickel and cobalt doping is fractioned between the two metals (i.e. a value of the function of x+y). x may have a value equal to or greater than 0.175 and equal to or less than 0.275; and y has a value equal to or greater than 0.1 and equal to or less than 0.35. The value of x+y may be equal to or greater than 0.3. The values of x and y both may be greater than 0.13. More specifically, when x is 0.175, y has a value equal to or greater than 0.2 and equal to or less than 0.35; when x is 0.2, y has a value equal to or greater than 0.15 and equal to or less than 0.3; when x is 0.225, y has a value equal to or greater than 0.1 and equal to or less than 0.25; when x is 0.25, y has a value equal to or greater than 0.05 and equal to or less than 0.2, more specifically y has a value equal to or greater than 0.1 and equal to or less than 0.2; when x is 0.275, y has a value equal to or greater than 0.05 and equal to or less than 0.15, preferably y has a value equal to 0.15; when x is 0.3, y has a value equal to or greater than 0.05 and equal to or less than 0.1; and when x is 0.325, y has a value equal to 0.05. Alternatively, when y is 0.05, x has a value equal to or greater than 0.25 and equal to or less than 0.325; when y is 0.1, x has a value equal to or greater than 0.225 and equal to or less than 0.3, more specifically x has a value equal to or greater than 0.225 and equal to or less than 0.25; when y is 0.15, x has a value equal to or greater than 0.2 and equal to or less than 0.275; when y is 0.2, x has a value equal to or greater than 0.175 and equal to or less than 0.25; when y is 0.25, x has a value equal to or greater than 0.175 and equal to or less than 0.225; when y is 0.3, x has a value equal to or greater than 0.175 and equal to or less than 0.2; and when y is 0.35, x has a value equal to 0.175.

The compound of the present invention may be defined as having a layered structure. Typically layered structures have been shown to have the highest energy density. When in the layered form, the cobalt-only doped material can be further defined using the general formula $aLi_2MnO_3 \cdot (1-a)LiCoO_2$ such that a may be less than 0.88. More preferably a is equal or greater than 0.7 and equal to or less than 0.8. Specifically the material may be $0.8Li_2MnO_3 \cdot 0.2LiCoO_2$., or the material may be $0.7Li_2MnO_3 \cdot 0.3LiCoO_2$. These particular layered structures exhibit improved capacity and increased stability over a number of charge cycles.

When in the layered form, the nickel-cobalt doped material can be further defined using the general formula $(1-a-b)Li_2MnO_3 \cdot aLiCoO_2 \cdot bLiNi_{0.5}Mn_{0.5}O_2$ (where a=y; and b=2x) such that a is equal to or greater than 0.15 and equal to or less than 0.2; and b is 0.4. Two particular compositions of interest are a=0.2 b=0.4; and a=0.15 b=0.4. Specifically the material may be $0.45Li_2MnO_3 \cdot 0.15LiCoO_2 \cdot 0.4LiNi_{0.5}Mn_{0.5}O_2$, or the material may be $0.4Li_2MnO_3 \cdot 0.2LiCoO_2 \cdot 0.4LiNi_{0.5}Mn_{0.5}O_2$. These particular layered structures exhibit improved capacity and increased stability over a number of charge cycles.

In a second aspect, the present invention provides an electrode comprising a compound of the first aspect. In a particular example the electrode comprises 3 fractions. The first is the compound of the present invention as previously described (in a variety of mass percentages from 60-98%, however, typically 70, 75, 80, 90 and 95%). The second fraction of the electrode comprises electroactive additives such as carbon, for example, Super P® and Carbon black, which comprises 60-80% of the mass fraction remaining excluding the first fraction. The third fraction is typically a polymeric binder such as PVDF, PTFE, NaCMC and NaAlginate. In some case additional fractions maybe included and the overall percentages may change. The overall electrochemical performance of the cathode material can be improved by the introduction of electroactive additives, and the structural properties of the resulting cathode can also be improved by adding material that improves cohesion of the cathode material and adhesion of the material to particular substrates.

In a third aspect, the present invention provides an electrochemical cell comprising a positive electrode according to the description above, an electrolyte and a negative electrode (anode).

BRIEF DESCRIPTION OF THE FIGURES

In order that the present invention may be more readily understood, embodiments of the invention will now be described, by way of example, with reference to the accompanying Figures, in which.

DETAILED DESCRIPTION OF THE DISCLOSURE

Figure 1:
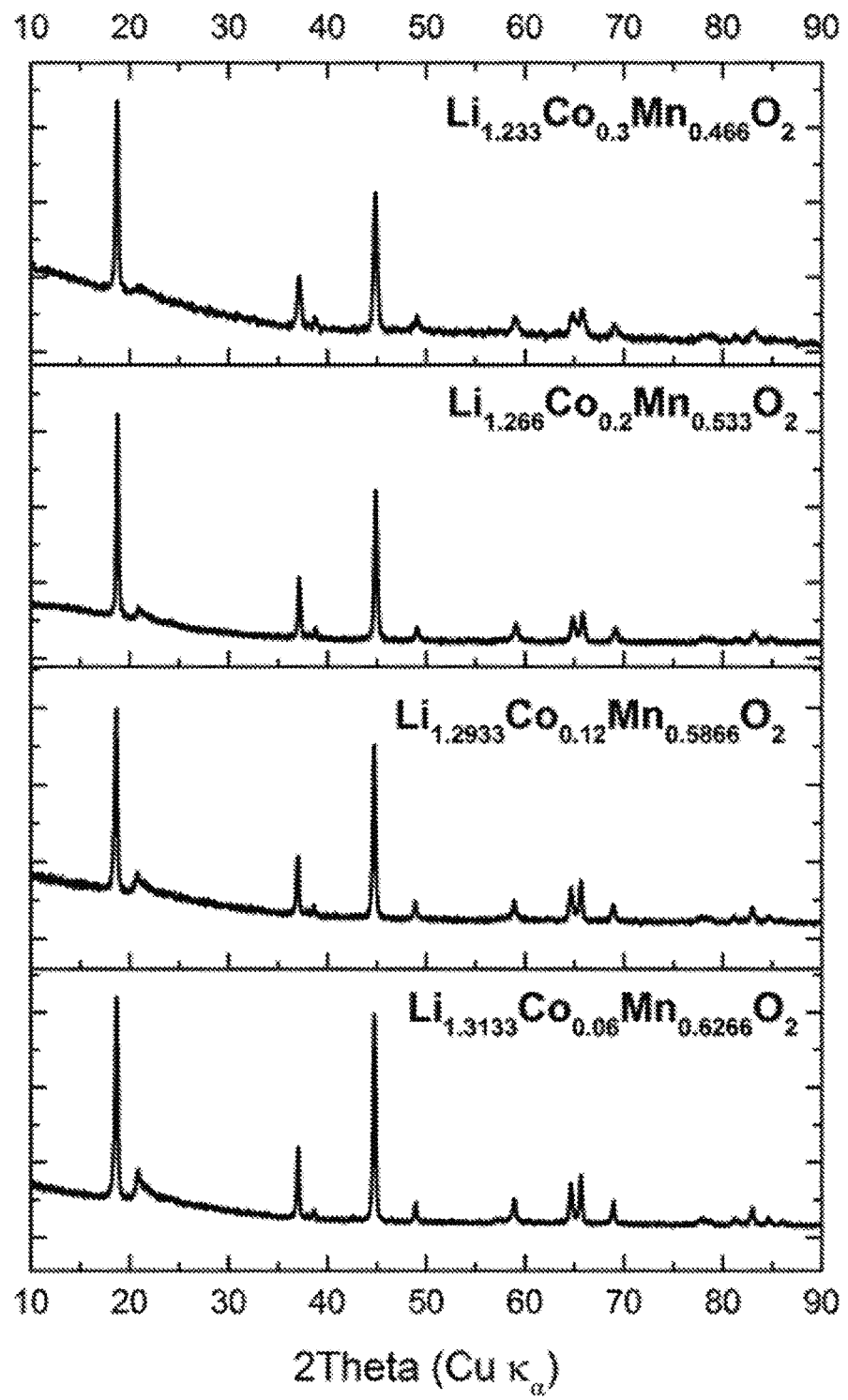
FIG. 1 shows powder X-ray Diffraction patterns of synthesised materials in accordance with Example 1.

The present invention will now be illustrated with reference to the following examples.

Example 1

Synthesis of the Cobalt and Cobalt-Nickel Substituted Lithium Rich Materials

For material doped with cobalt only (i.e. x=0) the Formaldehyde-Resorcinol sol gel synthetic route was employed to synthesise materials with general formula

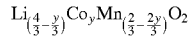

with y=0, 0.06, 0.12, 0.2 and 0.3 all the reagents ratios were calculated in order to obtain 0.01 mol of the final product.

Stoichiometric amounts of $CH_3COOLi \cdot 2H_2O$ (98.0%, Sigma Aldrich®), $(CH_3COO)_2Mn \cdot 4H_2O$ (>99.0%, Sigma Aldrich®) and $(CH_3COO)_2Co \cdot 4H_2O$ (99.0% Sigma Aldrich®) were dissolved in 50 mL of water with 0.25 mmol of $CH_3COOLi \cdot 2H_2O$ (99.0%, Sigma Aldrich®) corresponding to 5% moles of lithium with respect to the 0.01 moles of synthesized material. At the same time 0.1 mol of resorcinol (99.0%, Sigma Aldrich®) was dissolved in 0.15 mol of formaldehyde (36.5% w/w solution in water, Fluka®). Once all the reagents were completely dissolved in their respective solvents, the two solutions were mixed and the mixture was vigorously stirred for one hour. The resulting solution, containing 5% molar excess of lithium, was subsequently heated in an oil bath at 80° C. until the formation of a homogeneous white gel.

The gel was finally dried at 90° C. overnight and then heat treated at 500° C. for 15 hours and 800° C. for 20 hours.

For material doped with cobalt-nickel, The Formaldehyde-Resorcinol sol gel synthetic route was employed to synthesise materials with general formula

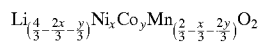

with across the range x has a value equal to or greater than 0.175 and equal to or less than 0.275; and y has a value equal to or greater than 0.1 and equal to or less than 0.35. specific compositions are represented where x=0.2y=0.2; and x=0.2y=0.15. In addition, a comparative example of a composition where x=0.275y=0.05 was synthesised for comparison. All the reagents ratios were calculated in order to obtain 0.01 mol of the final product.

Stoichiometric amounts of $CH_3COOLi \cdot 2H_2O$ (98.0%, Sigma Aldrich®), $(CH_3COO)_2Mn \cdot 4H_2O$ (>99.0%, Sigma Aldrich®) $(CH_3COO)_2Ni \cdot 4H_2O$ (99.0% Sigma Aldrich®) and $(CH_3COO)_2Co \cdot 4H_2O$ (99.0% Sigma Aldrich®) were dissolved in 50 mL of water with 0.25 mmol of $CH_3COOLi \cdot 2H_2O$ (99.0%, Sigma Aldrich®) corresponding to 5% moles of lithium with respect to the 0.01 moles of synthesized material. At the same time 0.1 mol of resorcinol (99.0%, Sigma Aldrich®) was dissolved in 0.15 mol of formaldehyde (36.5% w/w solution in water, Fluka®). Once all the reagents were completely dissolved in their respective solvents, the two solutions were mixed and the mixture was vigorously stirred for one hour. The resulting solution, containing 5% molar excess of lithium, was subsequently heated in an oil bath at 80° C. until the formation of a homogeneous white gel.

The gel was finally dried at 90° C. overnight and then heat treated at 500° C. for 15 hours and 800° C. for 20 hours.

Example 2

Structural Analysis and Characterisation of the Cobalt and Cobalt-Nickel Substituted Lithium Rich Materials The materials according to Example 1 were examined with Powder X-Ray Diffraction (PXRD) which was carried out utilising a Rigaku SmartLab® equipped with a 9 kW Cu rotating anode.

FIGS. 1 (cobalt doped) and 3A and 3B (nickel-cobalt doped compositions 1 and 2, respectively) show Powder X-ray Diffraction patterns of the synthesized materials. These are characteristic of layered materials with some cation ordering in the transition layer. All of the patterns appear to show the major peaks consistent with a close-packed layered structure such as $LiTMO_2$ with a R-3m space group. Additional peaks are observed in the range 20-30 2Theta degrees which cannot be assigned to the R-3m space. The order derives from the atomic radii and charge density differences between $Li^+$ (0.59 Å), $Ni^{+2}$ (0.69 Å) and $Mn^{4+}$ (0.83 Å) and appears the strongest in the structures of the low nickel doped oxides. The peaks are not as strong as in materials where a perfect order exists as in $Li_2MnO_3$. No presence of extra-peaks due to impurities was observed.

Example 3

Electrochemical Analysis of the Cobalt and Cobalt-Nickel Substituted Lithium Rich Materials All of the materials according to Example 1 were characterised electrochemically through galvanostatic cycling performed with a BioLogic VMP3 and a Maccor 4600 series potentiostats. All the samples were assembled into stainless steel coincells against metallic lithium and cycled between 2 and 4.8 V vs. $Li^+/Li$ for 100 cycles at a current rate of 50 $mAg^{-1}$. The electrolyte employed was LP30 (a 1M solution of $LiPF_6$ in 1;1 w/w ratio of EC;DMC).

Figure 2:
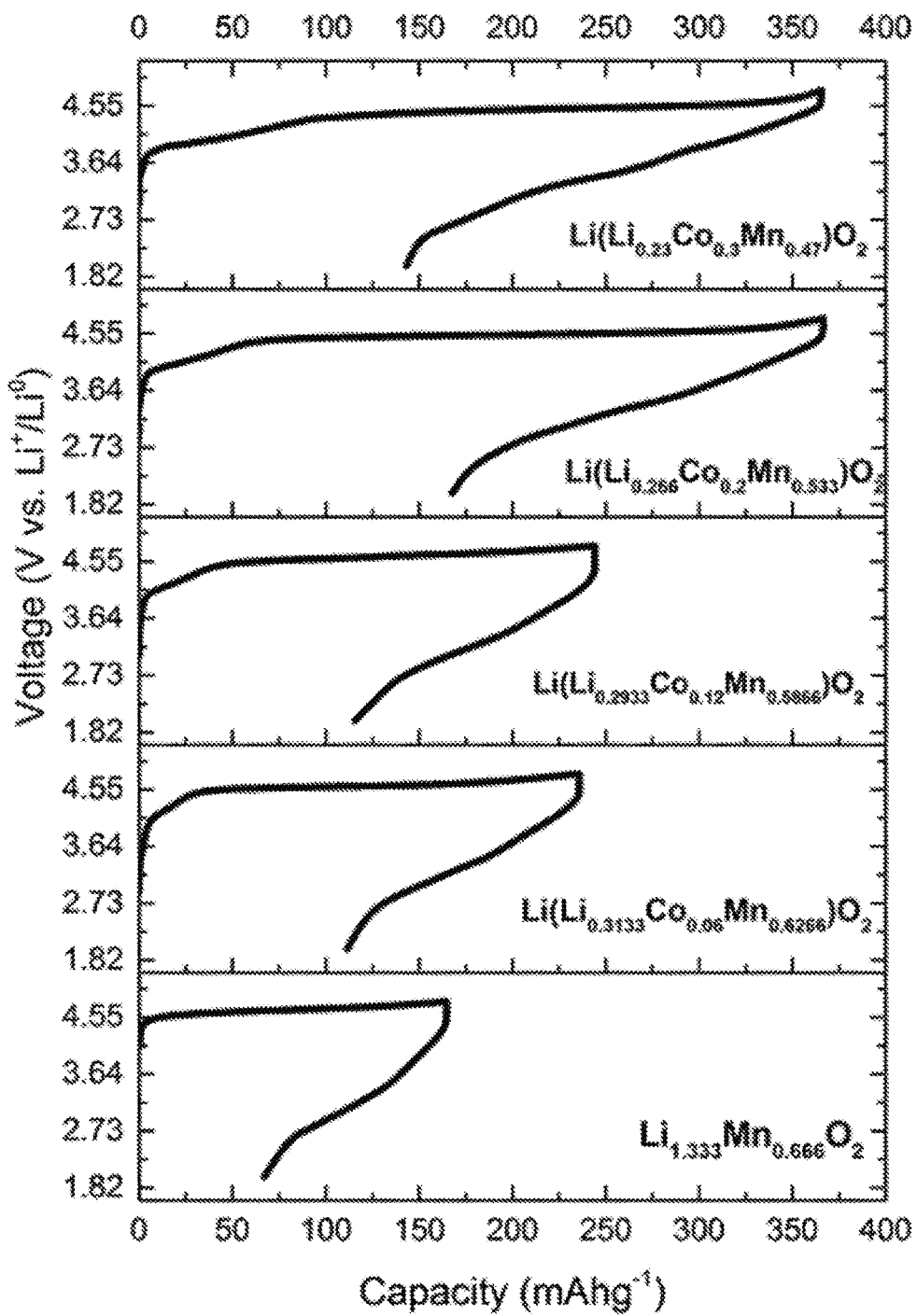
FIG. 2 shows first cycle galvanostatic load curves for the synthesised materials in accordance with Example 1.
Figure 3:
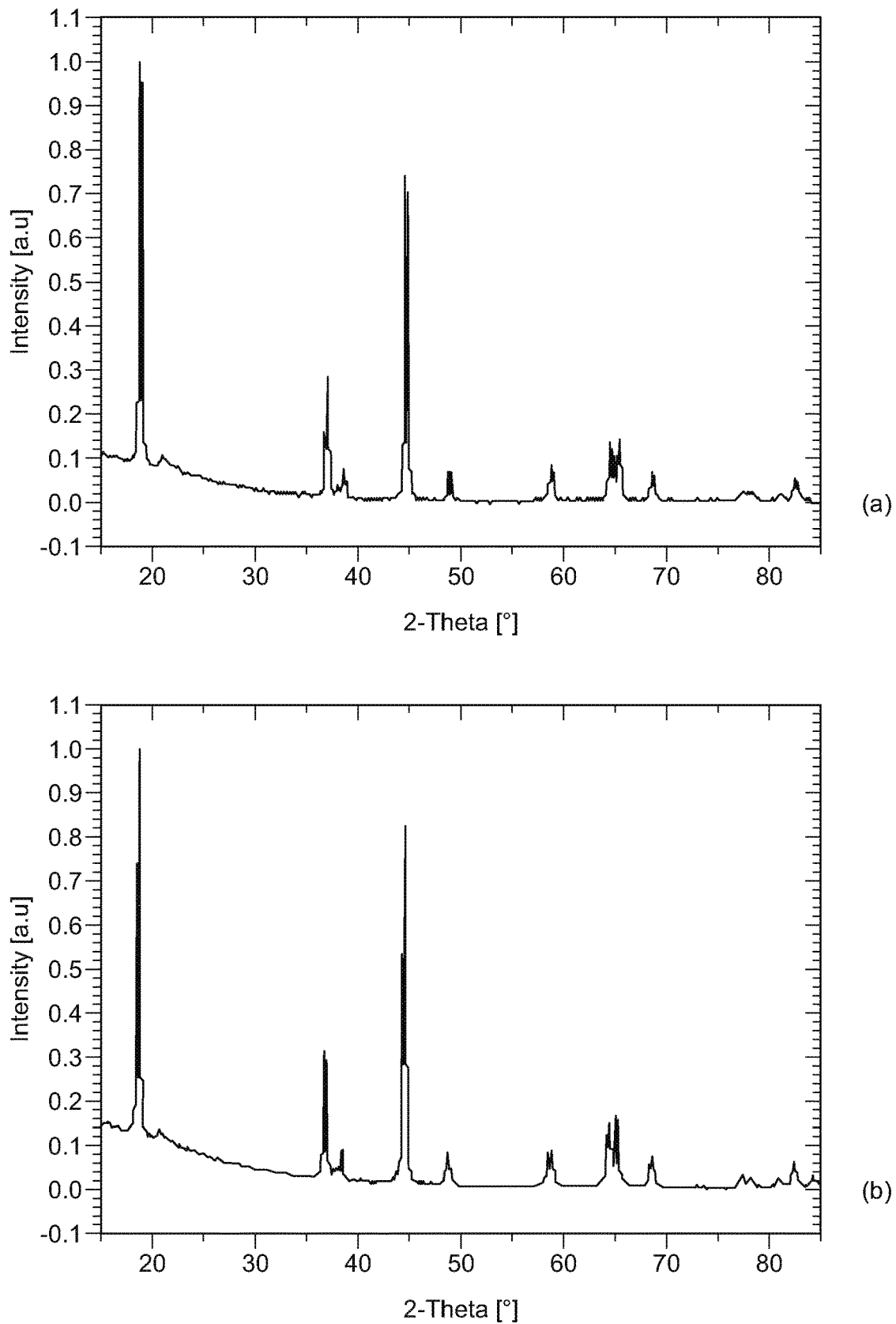
FIGS. 3A-3B show additional powder X-ray Diffraction patterns of two alternative synthesised materials in accordance with Example 1.
Figure 4:
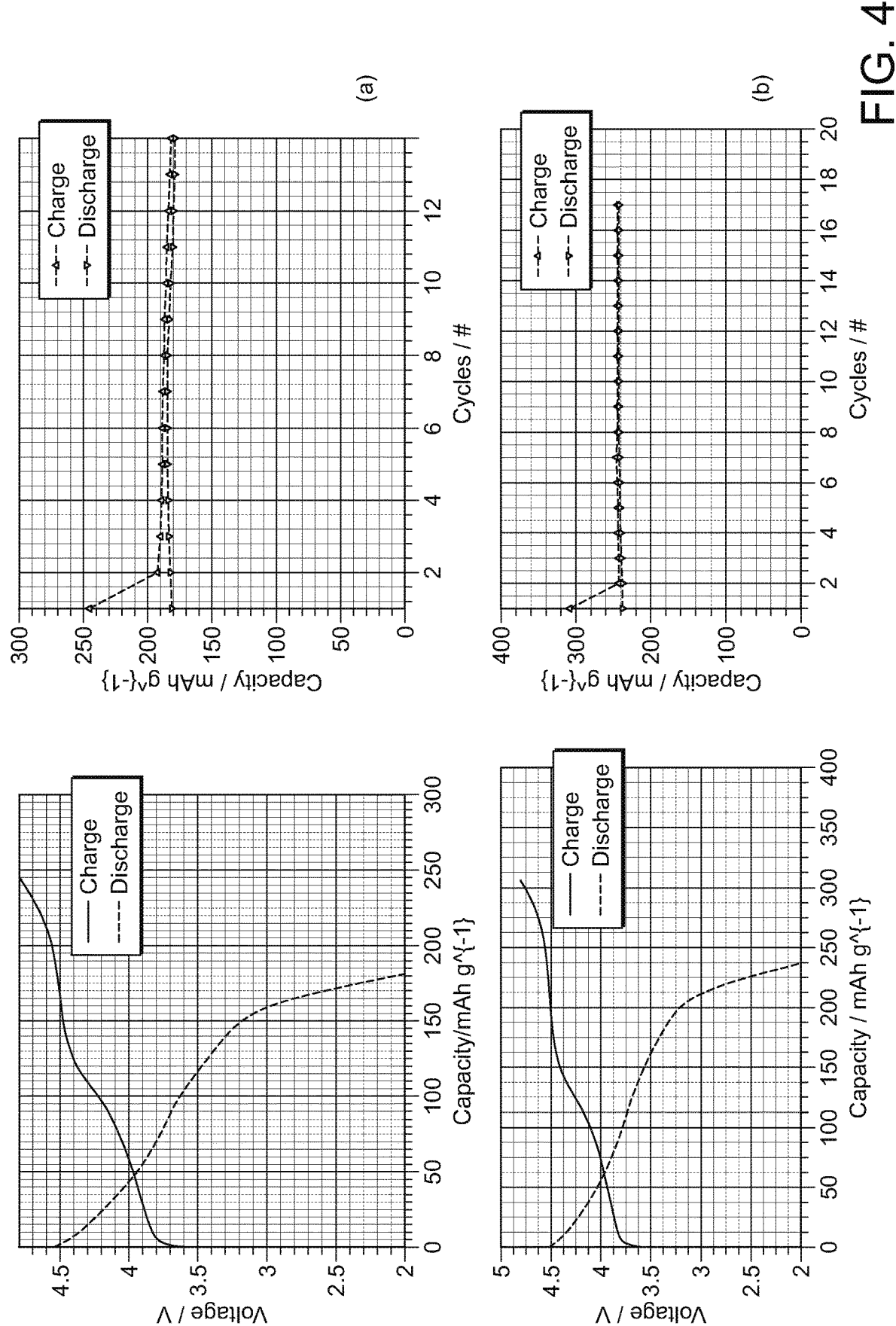
FIGS. 4A-4B show first cycle galvanostatic load curves for two alternative synthesised materials in accordance with Example 1, and capacity measurements over a number of cycles.
Figure 5:
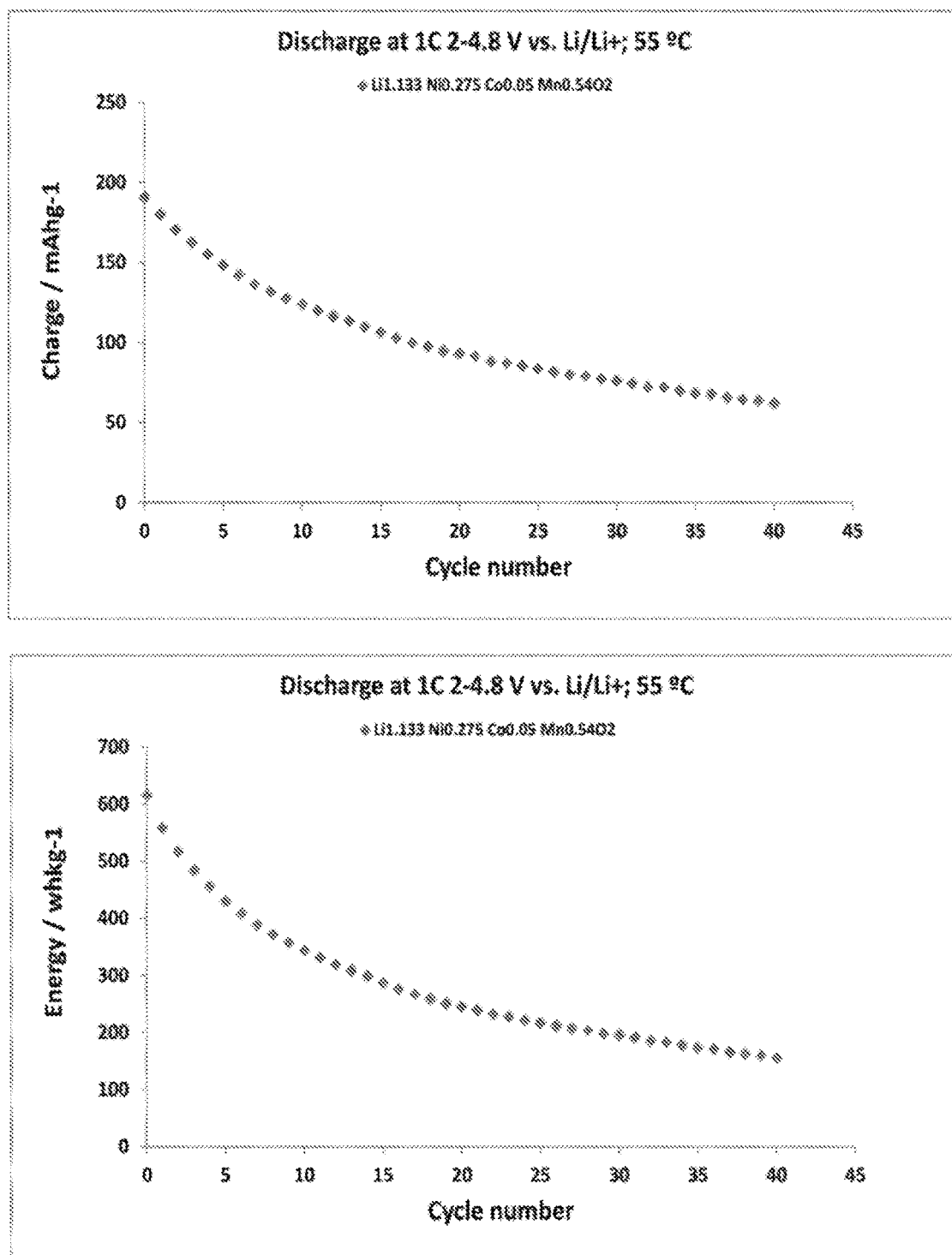
FIG. 5 shows first cycle galvanostatic load curves for comparative materials in accordance with Example 1.

FIG. 2 (cobalt doped) and FIGS. 4A-4B (nickel-cobalt doped compositions 1 and 2, respectively) show the potential curves during the charge and subsequent discharge of the first cycle for materials according to Example 1. Both samples present a high voltage plateau of different lengths centered on 4.5 V vs. $Li^+/Li^0$, and a sloped region at the beginning of the charge. The length of this region may be attributed to the oxidation of nickel from $Ni^{+2}$ toward $Ni^{+4}$ and $Co^{+3}$ toward $Co^{+4}$ and appears to be in good agreement with the amount of lithium (i.e. charge) that would be extracted accounting for solely the transition metal redox activity.

During the first discharge, neither material shows the presence of a reversible plateau, indicating a difference in the thermodynamic pathways followed during the extraction (charge) and insertion (discharge) of lithium ions from/in the lattice of each sample.

For the materials of Example 1 the first cycle presents the lowest coulombic efficiency value due to the presence of the high potential plateau which is not reversible. The coulombic efficiencies appear to quickly improve from the first cycle values, around 60-80%, to values higher than 98% within the first five cycles.

Compositions demonstrating the technical benefits in accordance with the Examples and the present invention are detailed below.

| Composition | Li | Mn | Co | Ni | O |
|---|---|---|---|---|---|
| 1 | 1.15 | 0.55 | 0.05 | 0.25 | 2 |
| 2 | 1.15 | 0.525 | 0.1 | 0.225 | 2 |
| 3 | 1.15 | 0.5 | 0.15 | 0.2 | 2 |
| 4 | 1.15 | 0.475 | 0.2 | 0.175 | 2 |
| 5 | 1.133333 | 0.541667 | 0.05 | 0.275 | 2 |
| 6 | 1.133333 | 0.516667 | 0.1 | 0.25 | 2 |
| 7 | 1.133333 | 0.491667 | 0.15 | 0.225 | 2 |
| 8 | 1.133333 | 0.466667 | 0.2 | 0.2 | 2 |
| 9 | 1.133333 | 0.441667 | 0.25 | 0.175 | 2 |
| 10 | 1.116667 | 0.533333 | 0.05 | 0.3 | 2 |
| 11 | 1.116667 | 0.508333 | 0.1 | 0.275 | 2 |
| 12 | 1.116667 | 0.483333 | 0.15 | 0.25 | 2 |
| 13 | 1.116667 | 0.458333 | 0.2 | 0.225 | 2 |
| 14 | 1.116667 | 0.433333 | 0.25 | 0.2 | 2 |
| 15 | 1.116667 | 0.408333 | 0.3 | 0.175 | 2 |
| 16 | 1.1 | 0.525 | 0.05 | 0.325 | 2 |
| 17 | 1.1 | 0.5 | 0.1 | 0.3 | 2 |
| 18 | 1.1 | 0.475 | 0.15 | 0.275 | 2 |
| 19 | 1.1 | 0.45 | 0.2 | 0.25 | 2 |
| 20 | 1.1 | 0.425 | 0.25 | 0.225 | 2 |
| 21 | 1.1 | 0.4 | 0.3 | 0.2 | 2 |
| 22 | 1.1 | 0.375 | 0.35 | 0.175 | 2 |

Compositions demonstrating higher levels of the technical benefits in accordance with the Examples and the present invention are detailed below.

| Composition | Li | Mn | Co | Ni | O |
|---|---|---|---|---|---|
| 1 | 1.15 | 0.525 | 0.1 | 0.225 | 2 |
| 2 | 1.15 | 0.5 | 0.15 | 0.2 | 2 |
| 3 | 1.15 | 0.475 | 0.2 | 0.175 | 2 |
| 4 | 1.133333 | 0.516667 | 0.1 | 0.25 | 2 |
| 5 | 1.133333 | 0.491667 | 0.15 | 0.225 | 2 |
| 6 | 1.133333 | 0.466667 | 0.2 | 0.2 | 2 |
| 7 | 1.133333 | 0.441667 | 0.25 | 0.175 | 2 |
| 8 | 1.116667 | 0.483333 | 0.15 | 0.25 | 2 |
| 9 | 1.116667 | 0.458333 | 0.2 | 0.225 | 2 |
| 10 | 1.116667 | 0.433333 | 0.25 | 0.2 | 2 |
| 11 | 1.116667 | 0.408333 | 0.3 | 0.175 | 2 |
| 12 | 1.1 | 0.475 | 0.15 | 0.275 | 2 |
| 13 | 1.1 | 0.45 | 0.2 | 0.25 | 2 |

| Composition | Li | Mn | Co | Ni | O |
|---|---|---|---|---|---|
| 14 | 1.1 | 0.425 | 0.25 | 0.225 | 2 |
| 15 | 1.1 | 0.4 | 0.3 | 0.2 | 2 |
| 16 | 1.1 | 0.375 | 0.35 | 0.175 | 2 |

Figure 6:
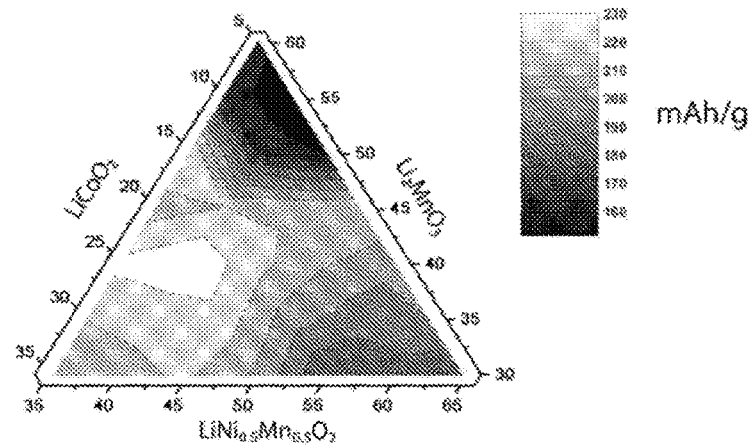
FIG. 6 shows ternary contour plots capacity and energy maps during discharge for materials of the present invention at 30° C., C/10, 2-4.8 V vs. Li/Li$^+$.
Figure 6:
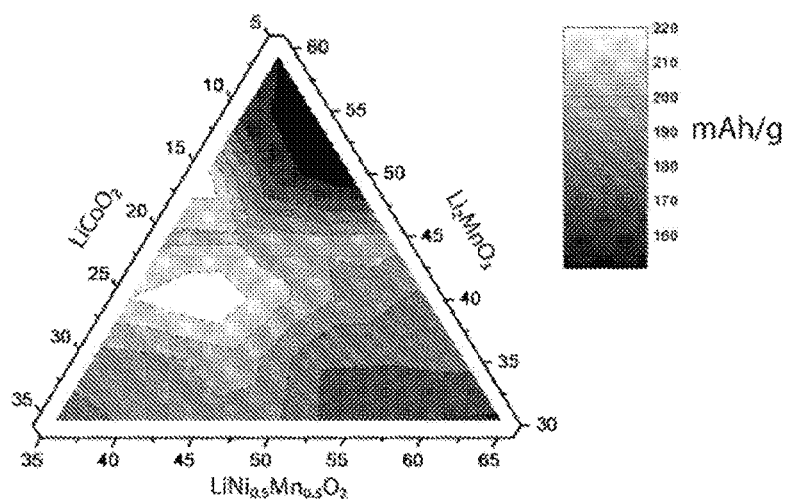
Figure 6:
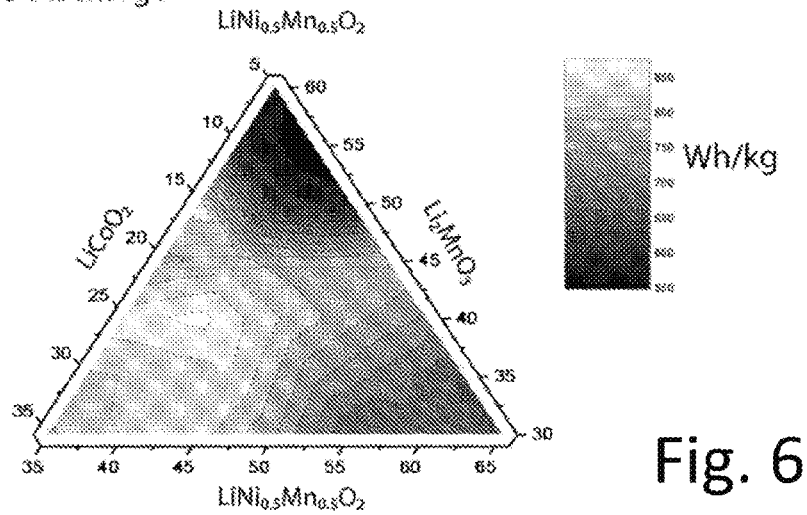
Figure 7:
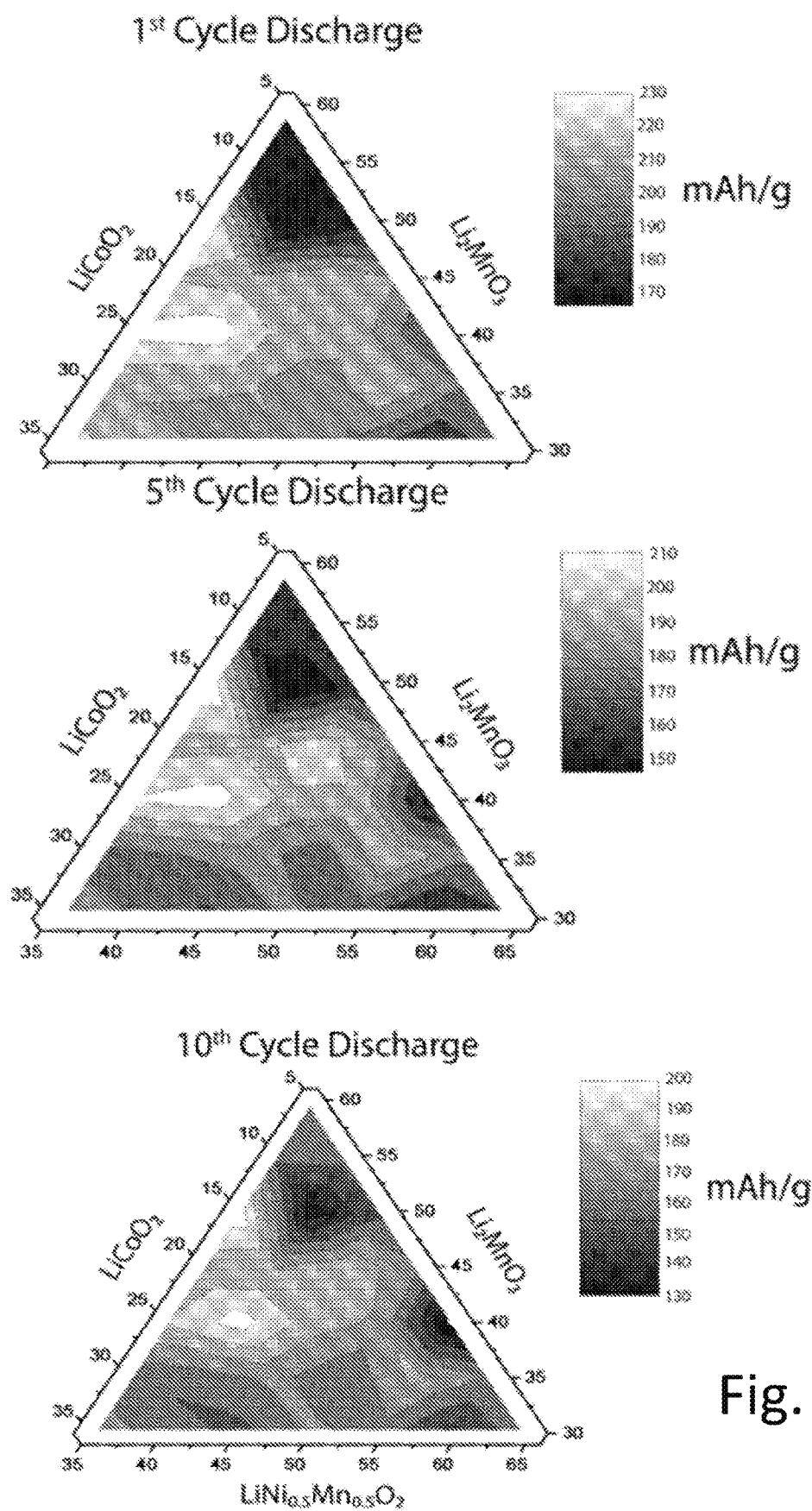
FIG. 7 shows ternary contour plots capacity and energy maps during discharge for materials of the present invention at 55° C., C/10, 2-4.8 V vs. Li/Li$^+$.

These materials were tested in accordance with the method above, and the results are shown in FIGS. 6 and 7 as ternary contour plots capacity and energy maps during discharge for materials of the present invention at 30° C. and 55° C. C./10, 2-4.8 V vs. Li/Li$^+$.

Example 4

Figure 8:
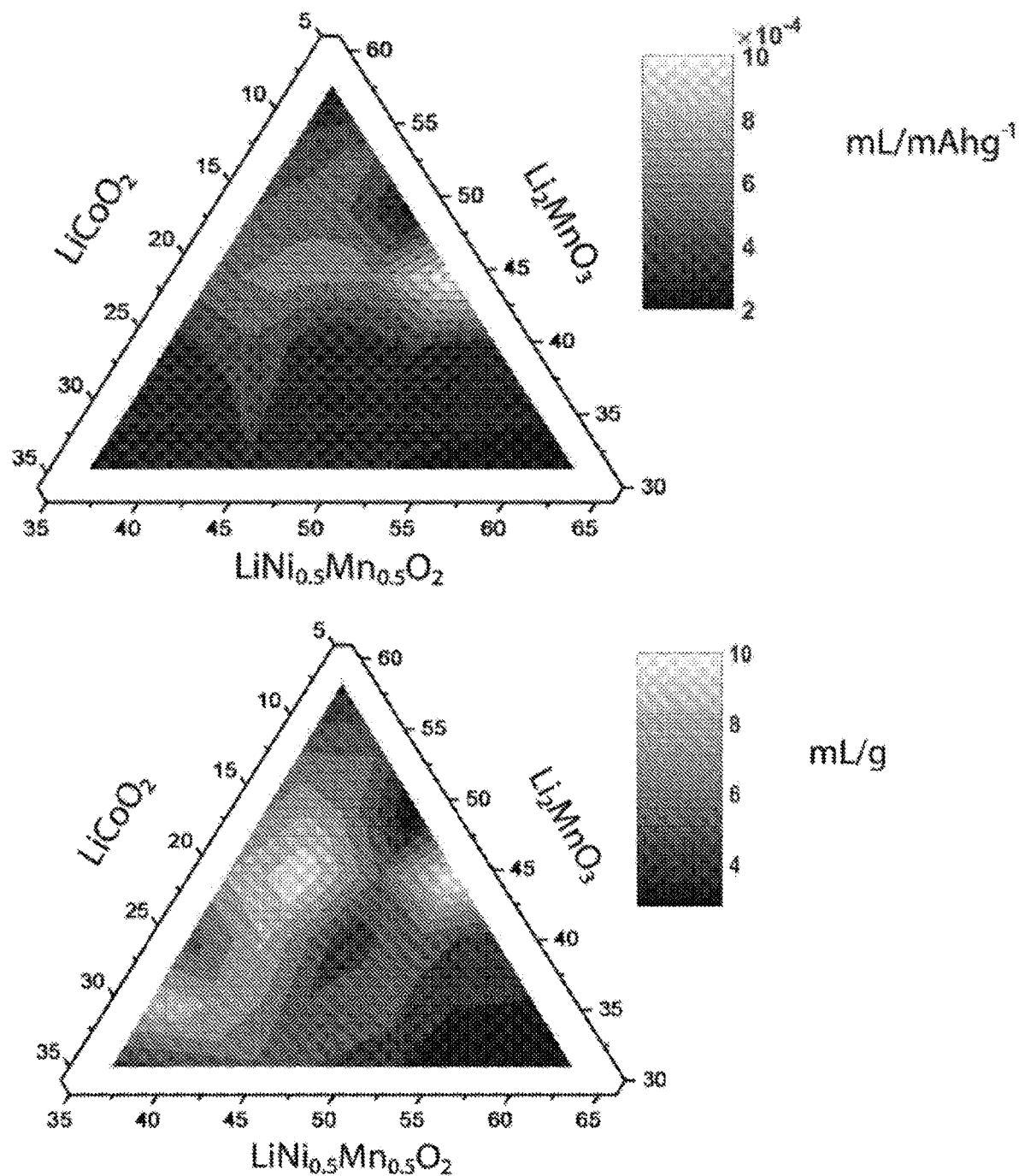
FIG. 8 shows ternary contour plots gas loss maps during discharge for materials of the present invention at 30° C., C/10, 2-4.8 V vs. Li/Li$^+$.

Gas Evolution During the First Cycle of the Nickel-Cobalt Substituted Lithium Rich Materials One pellet of each material according to the present invention was assembled into a EL-Cell PAT-Cell-Press® single cell. All the samples were assembled versus metallic lithium and cycled from OCV to 4.8 V vs. Li+/Li and then discharged to 2V at a current rate of 50 mAg-1. The electrolyte employed was LP30 (a 1M solution of LiPF6 in 1;1 w/w ratio of EC;DMC). This cell was specifically designed to record the pressure changes within the headspace, this could then be related to the mols of gas evolved from the cathode. The pressure sensor in the cell was connected via a controller box which was linked to a computer via a USB link. This was then logged via the Datalogger and EC-Link Software provided by EL-Cell®. The data was logged as Voltage, Current, time and pressure. These values could be combined through the ideal gas law to calculate the number of mols of gas evolved on cycling which could be used to calculate the volume of gas evolved under ambient conditions. The total gas loss for each material during charge was calculated and a contour plot generated as FIG. 8 which shows gas loss as a function of composition within the ternary space.

The invention claimed is:

1. A compound of the general formula:

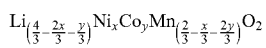

$$Li_{\left(\frac{4}{3}-\frac{2x}{3}-\frac{y}{3}\right)}Ni_xCo_yMn_{\left(\frac{2}{3}-\frac{x}{3}-\frac{2y}{3}\right)}O_2$$

wherein x has a value equal to or greater than 0.175 and equal to or less than 0.325, and y has a value greater than or equal to 0.05 and equal to or less than 0.35, and wherein an X-ray powder diffraction pattern of the compound includes a first characteristic peak at 2θ, 19° having a first peak intensity, and a second characteristic peak at 2θ, 45° having a secondary peak intensity, the second peak intensity being greater than about 75% of the first peak intensity.

2. The compound of claim 1, wherein x has a value equal to or greater than 0.2 and equal to or less than 0.275; and y has a value equal to or greater than 0.05 and equal to or less than 0.1.

3. The compound of claim 2, wherein the value of x+y is equal to or greater than 0.3.

4. The compound of claim 2, wherein when x is 0.2.

5. The compound of claim 2, wherein when x is 0.225.

6. The compound of claim 2, wherein when x is 0.275.

7. The compound of claim 1, wherein x is 0.3 and y has a value equal to or greater than 0.05 and equal to or less than 0.1.

8. The compound of claim 2, wherein when y is 0.05.

9. The compound of claim 2, wherein when y is 0.1.

10. An electrode comprising the compound of claim 1.

11. The electrode of claim 10, wherein the electrode comprises electroactive additives and/or a polymeric binder.

12. The electrode of claim 11, wherein the electroactive additive is selected from at least one of carbon or carbon black.

13. The electrode of claim 11, wherein the polymeric binder is selected from at least one of PVDF, PTFE, NaCMC or NaAlginate.

14. An electrochemical cell comprising a positive electrode of claim 10, an electrolyte, and a negative electrode.

* * * * *